(12) United States Patent
Porter et al.

(10) Patent No.: US 8,620,775 B2
(45) Date of Patent: Dec. 31, 2013

(54) RETAIL BEHAVIORAL TRACKING USING MICROSYSTEMS

(75) Inventors: Michael Ramey Porter, Antioch, TN (US); Joseph James Rozsnaki, Wetumpka, AL (US); Osman Ahmed, Hawthorn Woods, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 555 days.

(21) Appl. No.: 11/903,926

(22) Filed: Sep. 25, 2007

(65) Prior Publication Data

US 2008/0221943 A1 Sep. 11, 2008

Related U.S. Application Data

(60) Provisional application No. 60/847,056, filed on Sep. 25, 2006.

(51) Int. Cl.
*G06Q 10/00* (2012.01)

(52) U.S. Cl.
USPC ............... 705/28; 705/22; 705/24; 705/26.1; 705/29

(58) Field of Classification Search
None
See application file for complete search history.

(56) References Cited

U.S. PATENT DOCUMENTS

| 5,887,176 | A * | 3/1999 | Griffith et al. ................. 713/320 |
| 7,545,267 | B2 * | 6/2009 | Stortoni ................... 340/539.26 |
| 2002/0038267 | A1 * | 3/2002 | Can et al. ......................... 705/28 |
| 2002/0187025 | A1 * | 12/2002 | Speasl et al. .................. 414/287 |
| 2004/0049428 | A1 * | 3/2004 | Soehnlen et al. ............... 705/25 |
| 2004/0203434 | A1 * | 10/2004 | Karschnia et al. ......... 455/67.11 |
| 2005/0061008 | A1 * | 3/2005 | Ben-Nakhi et al. ............. 62/127 |
| 2006/0049249 | A1 * | 3/2006 | Sullivan ........................ 235/385 |

* cited by examiner

Primary Examiner — Fateh Obaid

(57) ABSTRACT

An arrangement includes a plurality of containers and a processing circuit. Each of the plurality of containers has a microsystem disposed thereon. Each microsystem is configured to sense at least one environmental condition and to sense movement of the corresponding container. The microsystem is configured to communicate information regarding the at least one environmental condition and the movement wirelessly. The processing circuit is operably coupled to receive the information regarding the at least one environmental condition and the movement from each of the microsystems.

13 Claims, 7 Drawing Sheets

RETAIL BEHAVIORAL TRACKING USING MICROSYSTEMS

This application claims the benefit of U.S. Provisional Patent Application Ser. No. 60/847,056, which was filed on Sep. 25, 2006, and which is incorporated herein by reference.

FIELD OF THE INVENTION

The present invention relates to retail establishments, and more particularly, to business information regarding retail establishments.

BACKGROUND OF THE INVENTION

It is useful to analyze customer behavior in retail establishments in order to determine efficient placement of products. Product placement and grouping can affect the retail shopper experience, and/or efficient store operation.

Currently, rudimentary shopping habit information may be obtained through the gathering of data at the retail "checkout" terminals. Such information can provide some insight to customer shopping habits, but provides little or no information regarding the effect of placement of products or shopping behavior.

There is a need, therefore, for an efficient system or method to obtain more comprehensive business information regarding retail behavior.

SUMMARY OF THE INVENTION

The present invention addresses the above mentioned issue by incorporating wireless microsystems sensors throughout a retail establishment, and/or employing RFID technology in products or product packaging. The sensors may be used to measure environmental conditions, energy consumption, and/or to track and locate products having RFID tags associated physically therewith. In some embodiments, the wireless microsystems have the ability to track, at least to some degree, customer traffic.

A first embodiment is an arrangement that includes a plurality of containers and a processing circuit. Each of the plurality of containers has a microsystem disposed thereon. Each microsystem is configured to sense at least one environmental condition and to sense movement of the corresponding container. The microsystem is configured to communicate information regarding the at least one environmental condition and the movement wirelessly. The processing circuit is operably coupled to receive the information regarding the at least one environmental condition and the movement from each of the microsystems.

DETAILED DESCRIPTION

Figure 1:
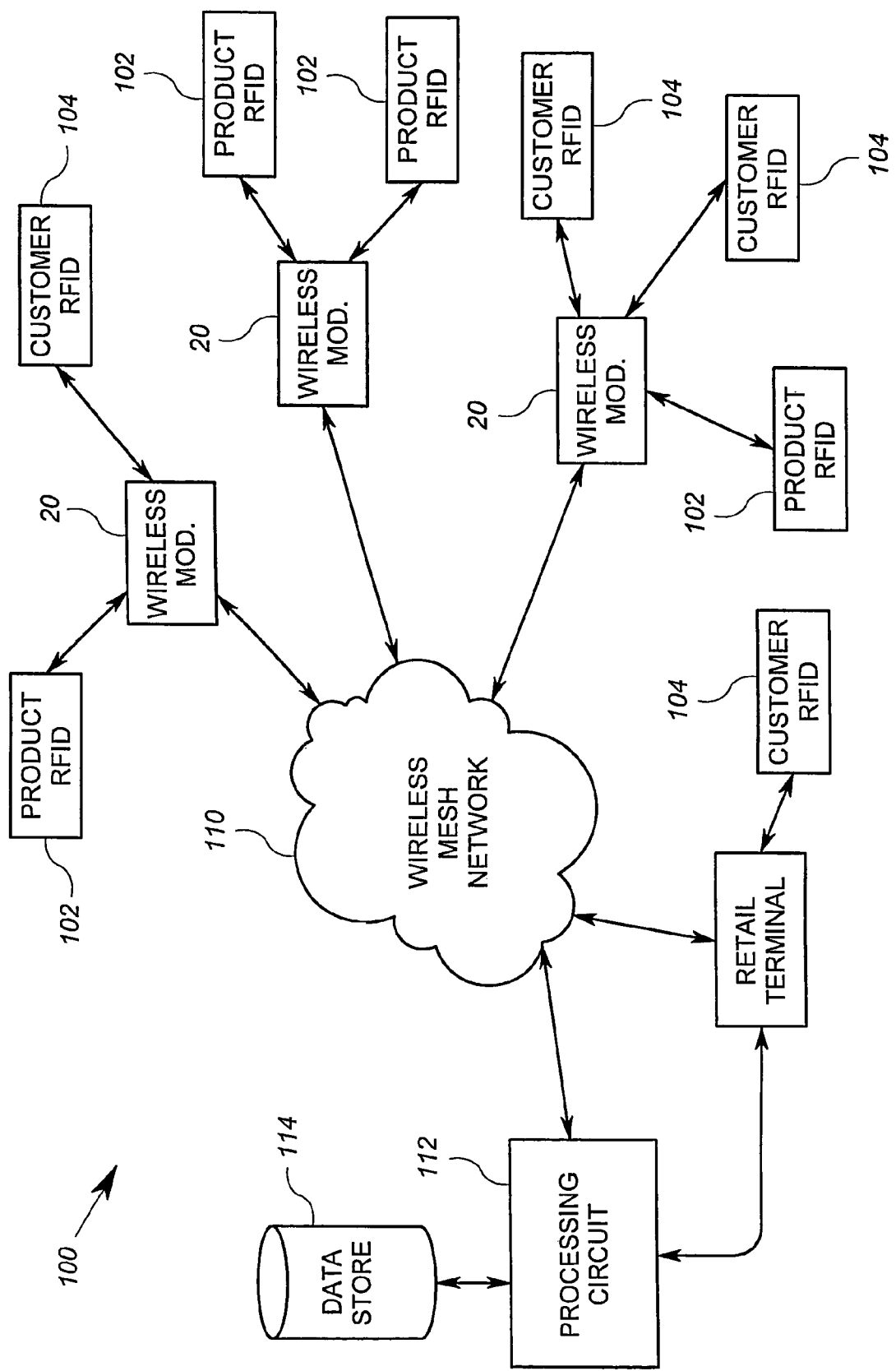
FIG. 1 shows an arrangement for gathering business information in a retail establishment in accordance with an exemplary embodiment of the invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 4:
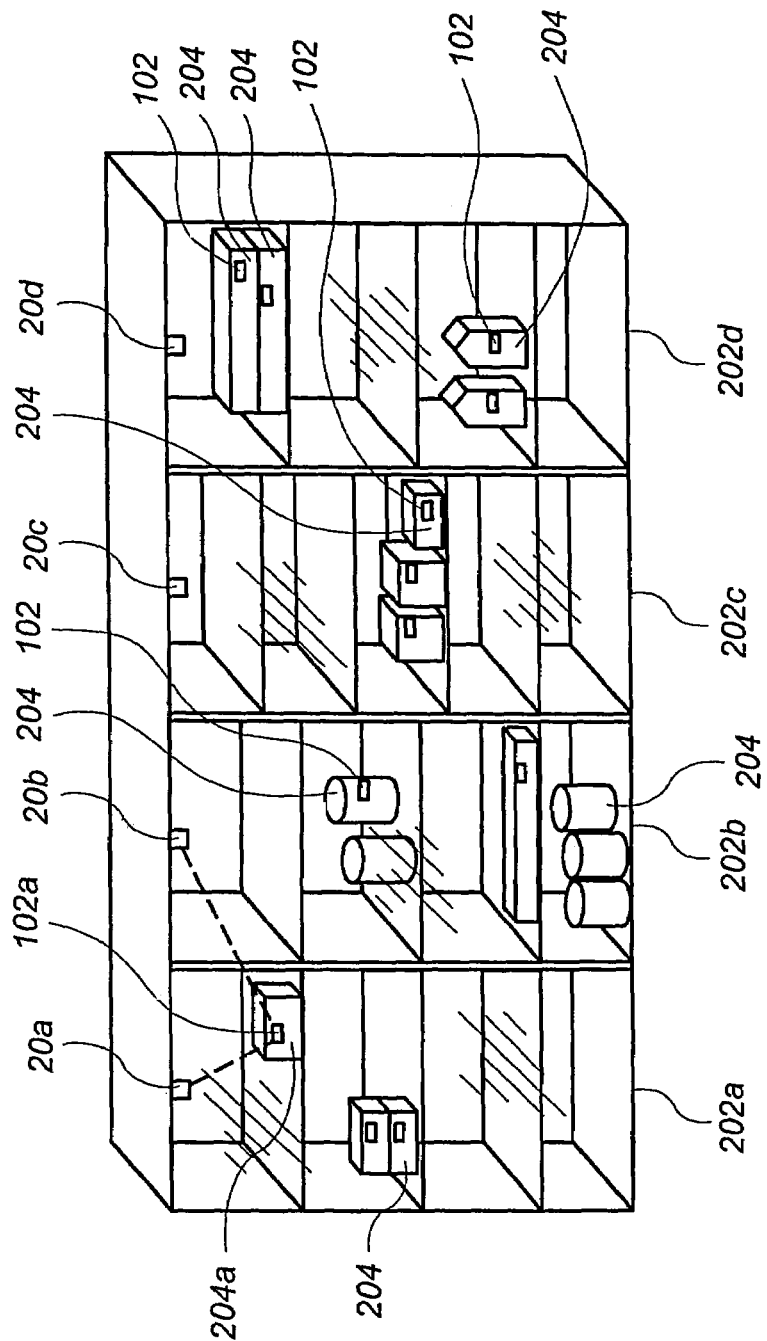
FIG. 4 shows in further detail a portion of the arrangement of FIG. 1.

FIG. 1 shows an arrangement 100 for gathering business information in accordance with a first exemplary embodiment of the invention. FIG. 4 shows in further detail a portion of the arrangement 100 employed in a refrigerator/freezer unit of a retail food store.

Referring to FIG. 1, the arrangement 100 includes a plurality of wireless sensor modules 20, a plurality of retail product RFID devices 102, a plurality of customer RFID devices 104, at least a first retail terminal 106, a wireless mesh network 110, a wired network 108, a processing circuit 112, and a business data repository 114.

The wireless sensor modules 20 are wireless devices that are operable to sense one or more environmental conditions (e.g. temperature, humidity, light, sound, gas content), detect the proximity of (and possibly the location of) RFID devices 102, 104. The wireless sensor modules 20 are also operable to perform wireless communications. The wireless sensor modules 20 are disposed throughout the retail establishment and thus help form the wireless mesh network 10. While the sensor modules 20 may differ, they have the general structure described below in connection with FIGS. 2 and 3. It is noted that because many of the sensor modules 20 may be permanently affixed to structures in the arrangement 100, at least some of the sensor modules 20 may alternatively use wired connections to receive operating power, or for communications. However, wireless sensor modules 20 significantly reduce installation time and cost.

The retail product RFID devices 102 are RFID tags attached to retail products or at least the packaging thereof. An RFID device, as is known in the art, is a device with at least enough memory to store identification information, and which is able to transmit data using RF energy stored from an external transmission. For example, when another device transmits a query signal to an RFID device, the RFID device receives the query signal using an RF receiver, stores energy from the received signal, and uses the stored energy to transmit a responsive message. The responsive message may suitably include the identification information stored in the RFID device. Such devices are known. In this case, the identification information stored in the product RFID devices 102 should be enough to identify at least the type of product (i.e. SKU).

As is known in the art, the RFID device 102 includes a readable and writeable memory that can be used to store additional information received in the received RF signals. The RFID device 102 can thus store information received in RF signals using the energy stored from the received RF signals.

The customer RFID devices 104 are similar to the retail product RFID devices, except that they are attached to objects that are associated with customers. By way of example, the customer RFID devices 104 may be attached to shopping carts, hand-held shopping baskets or "frequent customer cards". At some point, driver's licenses or other standard ID cards may include RFID information which may be used by the system, provided that privacy laws are upheld. Actual identification of the customer (name, personal ID info) is not necessary, and thus privacy need not be compromised. However, it may be useful to be able generically distinguish between customers (i.e. customer A, customer B), even though their actual identity is not necessary.

The retail terminal 106 may suitably be a "check-out" terminal that is configured to provide transaction information to another device over a wired network 108. Such devices are known in the art. Such devices provide identification of each product purchased in a single transaction.

The wired network 108 may be any suitable data network within the building, such as an Ethernet network or the like.

The wireless mesh network 110 is a network formed by distributed wireless devices, including the wireless sensor modules 20. To this end, it will be appreciated that the mesh network may also include wireless modules that have the same wireless functionality of the wireless sensor modules 20, but do not necessarily include sensors. The mesh network 110 may in some cases also include AC powered devices have RF transceivers.

The processing circuit 112 may suitably be a part or all of a general purpose computer configured to perform the operations necessary to carry out the functions discussed herein. In one embodiment, the processing circuit 112 is part of a control station for a building automation system, such as, for example, the INSIGHT™ work station available from Siemens Building Technologies, Inc., where the INSIGHT™ work station is properly configured to carry out the functions discussed herein.

The data storage device 114 is any suitable memory device, or combination of memory devices, that stores information gathered by the wireless sensors 20 and communicated to the processing circuit 112. Such information may include environmental information sensed by the sensors 20 and product location information obtained by the sensors 20 using the RFID devices 102, and customer traffic obtained by the sensors 20 using the RFID devices 104. Purchasing information may be obtained from the retail terminal 106. The wireless sensors 20 provide location information regarding the products by locating the RFID devices 102 using radar or another location technology, such as one based on the technology disclosed in published U.S. patent application Ser. No. 10/951,451, which is incorporated herein by reference.

In general, the microsystem sensors 20 may use built-in radar sensing to track product placement via the RFID devices 102, and track customer traffic using the RFID devices 104. In addition, the retail terminal 106 tracks purchasing of the products. Such information may be gathered in the data repository 114 and analyzed to determine how product placement, customer traffic patterns, and purchasing interrelate. In addition, the effects of factors such as temperature and humidity may be analyzed, as well as lighting. Studies may be made regarding what objects were actually observed by a customer compared to what the customer purchased. The amount of time a customer spends at different locations may also be tracked.

There are multitudes of analysis and information that may be obtained using the basic architecture of FIGS. 1 and 4, as well as variants thereof.

It is noted that sensor modules 20 may be placed in the environment in which the customers occupy, such as in the normal open spaces of the facility. In these locations, the sensor modules 20 may monitor light, temperature, relative humidity and other customer comfort indices. Other sensor modules 20 may be placed in refrigeration cases that sense temperature and light. An example of this implementation is discussed below in connection with FIG. 4. Preferably, then, the sensor modules 20 are disposed in a sensing relation with the process variable that it is intended to sense. The sensor modules 20 may be affixed to walls, ceilings, shelves, doors, and nearly any device that experiences at least some of the same environmental conditions as products and/or customers in the vicinity. In other embodiments discussed further below, the sensor modules are disposed on products themselves.

Figure 2:
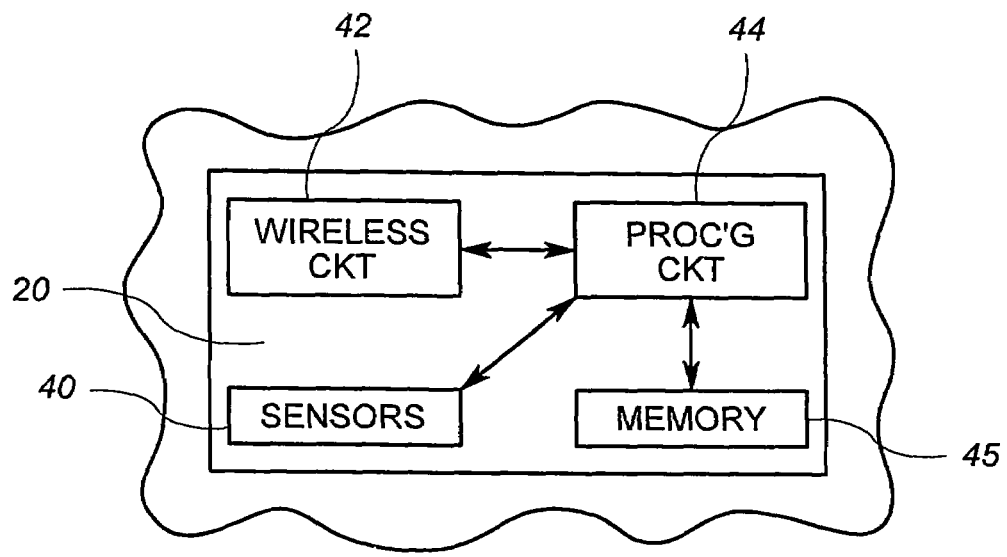
FIGS. 2 and 3 show an exemplary microsystem that may be used in the embodiment of FIG. 1.
Figure 3:
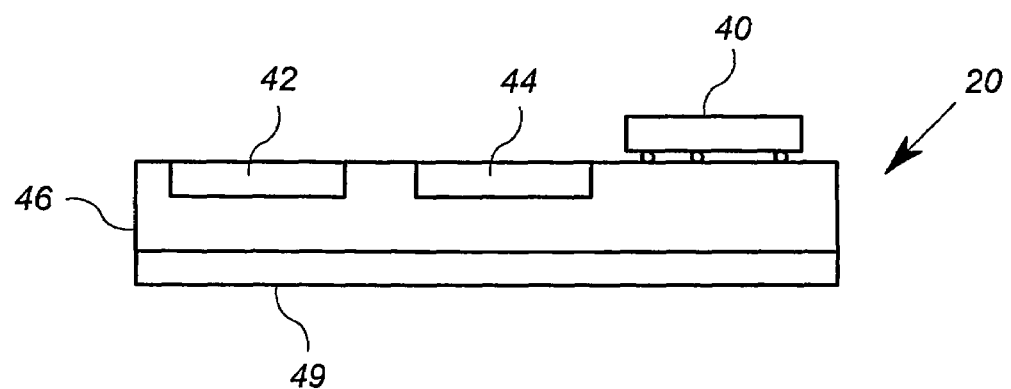

One example of a suitable sensor module 20 is shown in FIGS. 2 and 3 and discussed below. In order to detect or obtain the measurement information (i.e. pressure, temperature, etc.), the sensor module 20 includes a sensor device 40 that is configured to measure the specified quantity. The sensor module 20 further includes a wireless communication circuit 42 operable to communicate the measurement information (or information derived therefrom) to a remotely located wireless communication circuit, such as an RF base station (see FIG. 6), or others of the sensor modules 20 of FIG. 1. In the embodiment described herein, the wireless communication circuit 42 is operable to communicate using the wireless mesh network formed by the sensor modules 20, wireless modules, and possibly one or more wired base stations, not shown in FIG. 1.

In the embodiment described herein, the sensor device 40 is preferably one or more microelectromechanical system sensors or MEMS sensors. MEMS sensors have the advantage of requiring relatively little space and electrical power, and have relatively little mass. A combination MEMS pressure sensor and temperature sensor can readily fit onto a small enough footprint to allow the sensor module 20 to fit onto refrigerant piping.

It is preferable that the communication circuit 42 and the processing circuit 44 are incorporated onto the same substrate as the sensor device 40. To this end, on-chip Bluetooth communication circuits are known. In addition, methods of attaching MEMS devices to semiconductor substrates are known, such as is taught in connection with FIG. 8 of U.S. patent application Ser. No. 10/951,450 filed Sep. 27, 2004 and which is incorporated herein by reference. FIG. 3 shows a side view of an exemplary sensor module 20 wherein the various components are incorporated into one chip.

The processing circuit 44 is operable to generate digital information representative of the sensed quantities and prepare the information in the proper protocol for transmission.

Referring to FIG. 3, an advantageous embodiment of the sensor module 20 is a semiconductor substrate 46 having the processing circuit 44 and the communication circuit 42 formed thereon, and a MEMS sensor device 40 attached thereto, such as by flip-chip bonding. In addition, it would be advantageous to attach a power source such as a battery to the substrate 46. The battery may suitably be a lithium ion coin cell type structure 49 affixed to the side of the semiconductor substrate 46 opposite the processing circuit 44 and communication circuit 42. It will be appreciated that if a suitable communication circuit cannot be formed in the semiconductor substrate 46, it too may be separately formed and then attached via flip-chip or similar type of bonding.

While FIG. 1 shows the overall architecture of a generally applicable arrangement 100 for tracking retail purchasing behavior in accordance with at least some embodiments of the invention, FIG. 4 shows a portion of such an arrangement in further detail.

In particular, FIG. 4 shows a set of four refrigeration cases 202a, 202b, 202c and 202d having various products 204 located therein. Each refrigeration case 202a, 202b, 202c and 202d includes a corresponding sensor module 20a, 20b, 20c, and 20d. The sensor modules 20a, 20b, 20c and 20d are preferably physically supported on (i.e. attached to) the corresponding refrigeration case 202a, 202b, 202c and 202d, preferably on the inside. At least some of the products 204 include a product RFID device 102. Each of the sensor modules 20a, 20b, 20c and 20d is configured to communicate with the product RFID 102 of products within the corresponding case 202a-202d. The sensor modules 20a-20d are also capable of communicating with the processing circuit 112 (see FIG. 1) via the wireless mesh network 110 (see FIG. 1) and/or other means. The sensor modules 20a-20d are configured to measure environmental conditions such as temperature; light, humidity and/or other conditions.

As will be discussed below in detail, the sensor modules 20a-20d have the capability to determine which products 204 are located within a particular refrigeration case 202a-202d, and furthermore to determine physical conditions to the products 204 are exposed. Exemplary operations of the arrangement 100 illustrated in FIG. 1, with particular reference to the portion of the arrangement 100 in FIG. 4, are described below.

In a first embodiment, the product RFID devices 102 are passive ID devices that merely provide identification information and/or other static information (such as creation date, etc.) in response to a RF query signal. In this embodiment, the product RFID devices 102 do not store additional data while being used in the arrangement 100. Instead, other devices such as the sensors 20a-20d within the store use the RFID devices 102 to determine the location of the corresponding products 204, determine how long the products 204 are displayed before sale, and the general environmental conditions to which the products 204 are exposed while they are being displayed. As will be demonstrated in the example discussed below, a significant amount of retail product placement and customer behavior data may be obtained in such an embodiment.

Figure 5:
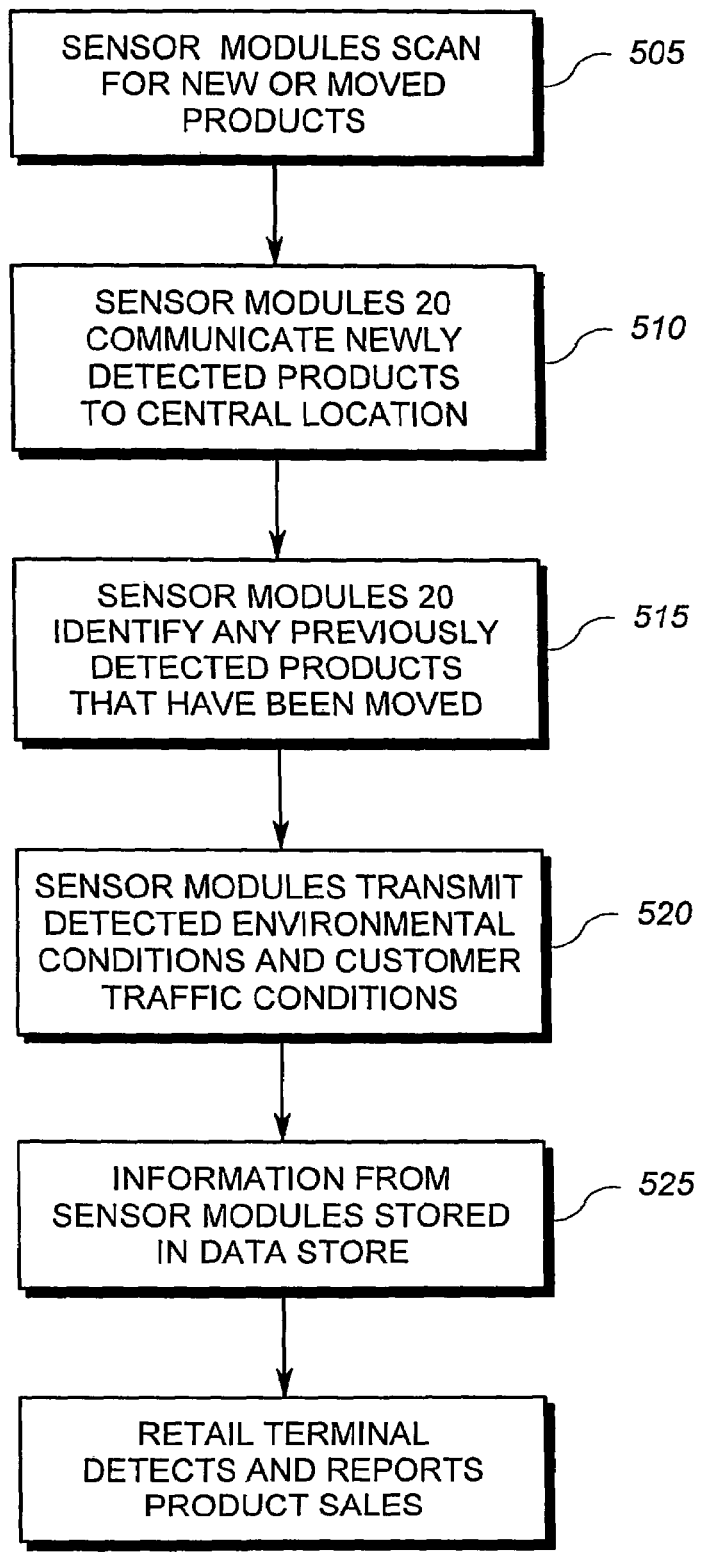
FIG. 5 shows a flow diagram of various operations of the arrangement of FIG. 1.

FIG. 5 shows a flow diagram of operations performed to obtain product retail information in the embodiment described above. While the operations described below are discussed in connection with the particular devices of FIG. 4 by way of example, it will be appreciated that the operations of FIG. 5 are generally applicable to other sensor modules, such as those on product shelves or racks outside of refrigeration cases.

The operations of FIG. 5 include operations of different devices, namely any one of the sensor modules 20, the retail terminal 106, and the processing circuit 112, to track a product and store information related to the display and sale. It is presumed that the retail store includes several sensor modules 20 that cover most or all of the available product display area. In some cases, sensor modules 20 may only be used in refrigerated sections, in the produce section, and/or other select areas of the store.

In step 505, each sensor module 20 attempts to locate new products (e.g. products 204 of FIG. 4) by sending a signal requesting RFID information. As will be discussed below in connection with step 515, each sensor module 20 also determines whether previously detected products are still present. To detect the presence of a new product, the sensor module 20 may suitably transmit a query for each new RFID device 102 in the store, or the RFID information of any product that has been moved (see step 515). To this end, the processing circuit 112 may suitably track when new products are unpacked for stocking, and provide the possible new products to multiple sensor modules. As a result, each sensor module 20 has a list of possible new products, and attempts to contact each of those new products.

During the execution of step 505 by multiple sensor modules, it is possible that more than one sensor module 20 may detect the presence of the same product. In such a case, the general location of the product may be discerned from the sensor modules that detect the product. In this case, various methods of obtaining further information about the product's location may be employed, such as using triangulation, signal strengths, and even radar. However, the exact location of the product may not be necessary. For example, in the refrigeration cases of FIG. 4, it may be sufficient to merely identify the refrigerator case 202a-202d in which a detected product is located. Such an identification may be made using signal strength measurements, or radar measurements, for an object that is detected by multiple sensors.

An exemplary operation of step 505 will now be described in connection with the example of FIG. 4. In this example, consider that the product 204a of FIG. 4 is newly placed in the refrigeration case 202a and is to be detected. From time to time, the sensors 20a, 20b, 20c and 20d send polling signals attempting to contact RFID devices 102 of new products 204. As discussed above, when a new product 204a enters the building, its identification may be manually or automatically detected and recorded in the data storage 114 via the processing circuit 112. (See FIG. 1). The processing circuit 112 then provides the new product ID information to the various sensor modules 20. The sensor modules 20 then attempt to contact that product through periodic polling.

Thus, referring again to FIG. 4, each of the sensors 20a-20d periodically polls for the ID of the new product 204a. When the product 204a is placed in the refrigeration case 202a, then the sensor 20a will receive a response to the polling signal. Moreover, it is possible that the sensor 20b in the adjacent case 202b, as well as possibly the sensor 20c in the next closest case 202c, will receive a response to the polling signal. The sensor modules 20a-20c may suitably use comparative signal strengths (detected in the sensor modules 20a-20c) to determine which sensor is closest. In this example, the sensor module 20a will measure a stronger response signal than either of the modules 20b and 20c from the product RFID device 102a because the sensor module 20a is closest to the RFID device 102a. Thus, it will be determined (by the processing circuit 112 or by the sensors 20a-20c) that the new product 204a and its RFID device 102a are located in the first refrigeration case 202a.

It will be appreciated that other more sophisticated location methods may be used to locate the product RFID devices 102.

Referring again to the general discussion of FIG. 5, once the location of any new product (e.g. product 204a of FIG. 4) is determined, then locating sensor module 20 provides the location information to the processing circuit 112 in step 510. The processing circuit 112 may then log the location of the new product, as well as the time of detection, which can be used as the time stamp of when the product was initially placed on display for purchase.

In step 515, each sensor 20 also periodically determines whether all previously detected products are still detectable. This operation is similar to that of step 505, except that the sensor 20 attempts to find products previously detected by the sensor 20, as opposed to new or moved products.

Thus, referring again to the example of FIG. 4, the sensor 20a may at some subsequent time attempt to determine whether the product 204a is still present in the case 202a. If a previously detected product is no longer detected, then the sensor 20 provides a message to the processing circuit 112 identifying that the product has been moved. In many cases, a product that is no longer detected is on its way to being purchased, but it is also possible that the product was merely moved to another location. If the processing circuit 112 receives such a message, it can provide a message for the sensors 20 of the arrangement 100 to attempt to find the product, as per step 505.

In addition to the location information, the sensor modules 20 from time to time transmit to the processing circuit 112 measured environmental conditions, including temperature, lighting, humidity, and even odor information. This operation is shown as step 520. It will be appreciated that while steps 505-520 appear to be sequential, these operations generally occur on an ongoing basis and are not per se sequential.

In the periodic operation of step 520, the sensor modules 20 may also detect and track the number of customer RFID devices 104 that pass in close proximity. Thus, each individual sensor module 20 provides a periodic "snapshot" of the local customer traffic as well as the local environmental conditions.

In step 525, the processing circuit 112 stores the information received from the sensor modules 20 in the data storage 114. Because the products (via their product RFID devices 102) can be associated with a location within the store (e.g. refrigeration compartment 202*a*), and because sensor data for conditions and traffic measured by sensors (e.g. 20*a*) can be associated with a location, the processing circuit 112 can provide information regarding the conditions to which each product is exposed while displayed for sale.

Eventually, in most cases, each product is sold. In step 530, the retail terminal 106 detects a sale of a product by detecting the product RFID device 102 at the checkout terminal, and/or via scanning a product code, as is known in the art. The retail terminal 106 provides this information to the processing circuit 112. The processing circuit 112 and consequently the data store 114 thereby obtain data as to when a product was initially displayed (from step 510), the location in which the product was displayed (also from step 510), the time at which the product was purchased (from step 530), and the various conditions that the product was exposed to between initial display and purchase (from various executions of step 525).

From this data, the duration of a product on display before purchase may be calculated, and this duration may be correlated to environmental and traffic conditions. From such information, the effects of various conditions, product placement, and other circumstances can be analyzed.

In a second alternative embodiment, the location information, environmental condition information and/or traffic information obtained by the sensor modules 20 may be stored on each product RFID device 102. To this end, the memory of the RFID devices 102 may be written to via RF signals. Such RFID devices are known. In such cases, each sensor module 20 would transmit the initial location information (i.e. that of step 505) and the periodic measurement data (i.e. that of step 520) to the RFID devices 102 located in close proximity to the sensor module 20. For example, the sensor module 20*a* would transmit the location information, and periodically transmit environmental and traffic data, to each RFID device 102 within the refrigeration case 202*a*.

In such an embodiment, each product RFID device 102 would contain a relatively complete record of a product location, the conditions the product was exposed to, and the customer traffic near the product. When a product is purchased, the retail terminal 106 may include an RFID reader that is configured to read out all of the various data stored in the memory of the RFID device 102 of the product being purchased. That information may be provided to the data storage 114 via the processing circuit 112. The product RFID device 102 could of course be read elsewhere, if desired.

In yet another embodiment, the product RFID devices 102 are replaced with product sensor modules similar to the sensor modules 20. In this embodiment, environmental conditions to which a product is exposed are measured directly on the product itself. In addition, information regarding orientation and handling of the product prior to purchase may be tracked in some embodiments.

FIGS. 6-9 illustrate an alternative embodiment to the system of FIG. 1 wherein individual objects or products are equipped with a sensor module.

Figure 6:
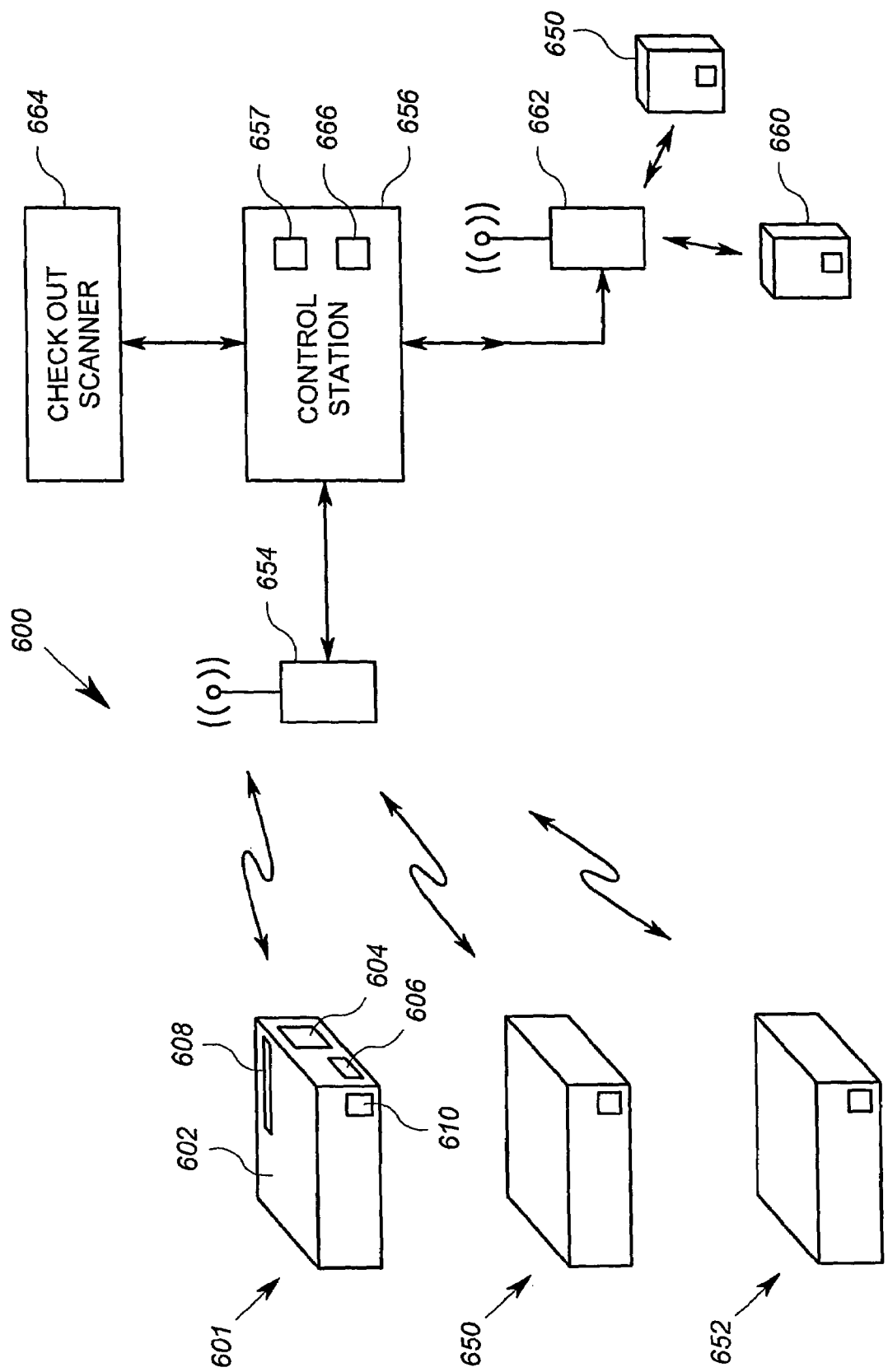
FIG. 6 shows an alternative arrangement according to the invention.

In particular, FIG. 6 shows a system 600 for gathering and storing data regarding retail product display, environment and purchase. The system 600 includes packaged products 601, 650, 652, 658 and 660, base stations 654 and 662, a check out terminal 664 and a control station 656. The elements of the system 600 are shown in limited numbers for clarity of exposition. It will be appreciated that a typical retail system according to embodiments of the invention will often includes hundreds, thousands or even more packaged products, several base stations, and multiple check out terminals.

The packaged products 601, 650, 652, 658 and 660 include devices that track conditions and other data relating to the product. As will be discussed below, such tracked conditions and other data is collected and stored, such as in the control station 656, where it may be analyzed or forwarded to a remote data warehouse or data analysis system. With reference to FIG. 1, the control station may suitable be the processing circuit 112 of FIG. 1 with or without the data store 114.

The packaged product 600 is explained in detail by way of example. The packaged products 650, 652, 658 and 660 have analogous features. Accordingly, it will be appreciated that in a retail environment, there may be several hundred or thousands of products having the data gathering features of the product 601, which may, for example, be a package of frozen food. Other packaged products may include dry foods (cereal, rice etc.), drinks, and refrigerated products (cartoned eggs, cheese, etc.). It is envisioned that all of these devices may include the features described below for the exemplary product 600.

Referring now to the example, the packaged product 600 includes a container 602 in which food product, not shown, is stored, and labeling disposed or printed on the container 602. In this embodiment, the labeling includes, among other things an ingredient list 604, a price tag 606, and cooking instructions 608. The packaged product 600 also includes also includes a sensor microsystem 610 coupled to the container 602.

Preferably, the sensor microsystem 610 is positioned on the container 602 such that it is most likely to sense the environmental conditions (light, temperature, humidity, etc.) to which the packaged product 600 is exposed. Thus, in most cases, the sensor microsystem 610 is placed on a "front panel" that typically intended for display. To this end, it is noted that those of ordinary skill in the art can readily determine a primary side of a package that is left exposed when the package is stacked or otherwise placed for display. Such a side will typically include the product name and any associated logos and artwork. However, many advantages of the embodiments described herein may be obtained even when the sensor microsystem 610 is placed on an area the container 602 that may be covered during display. For example, placement of the sensor microsystem 610 on the top panel of a product can result in covering of the sensor microsystem 610 when the product is not the top-most product in its stack. However, because it is likely that a particular product will be at the top of the stack at some point prior to purchase, placement of the sensor microsystem 610 on the top panel can yield sufficient environmental data for use in the retail information systems discussed herein.

Figure 7:
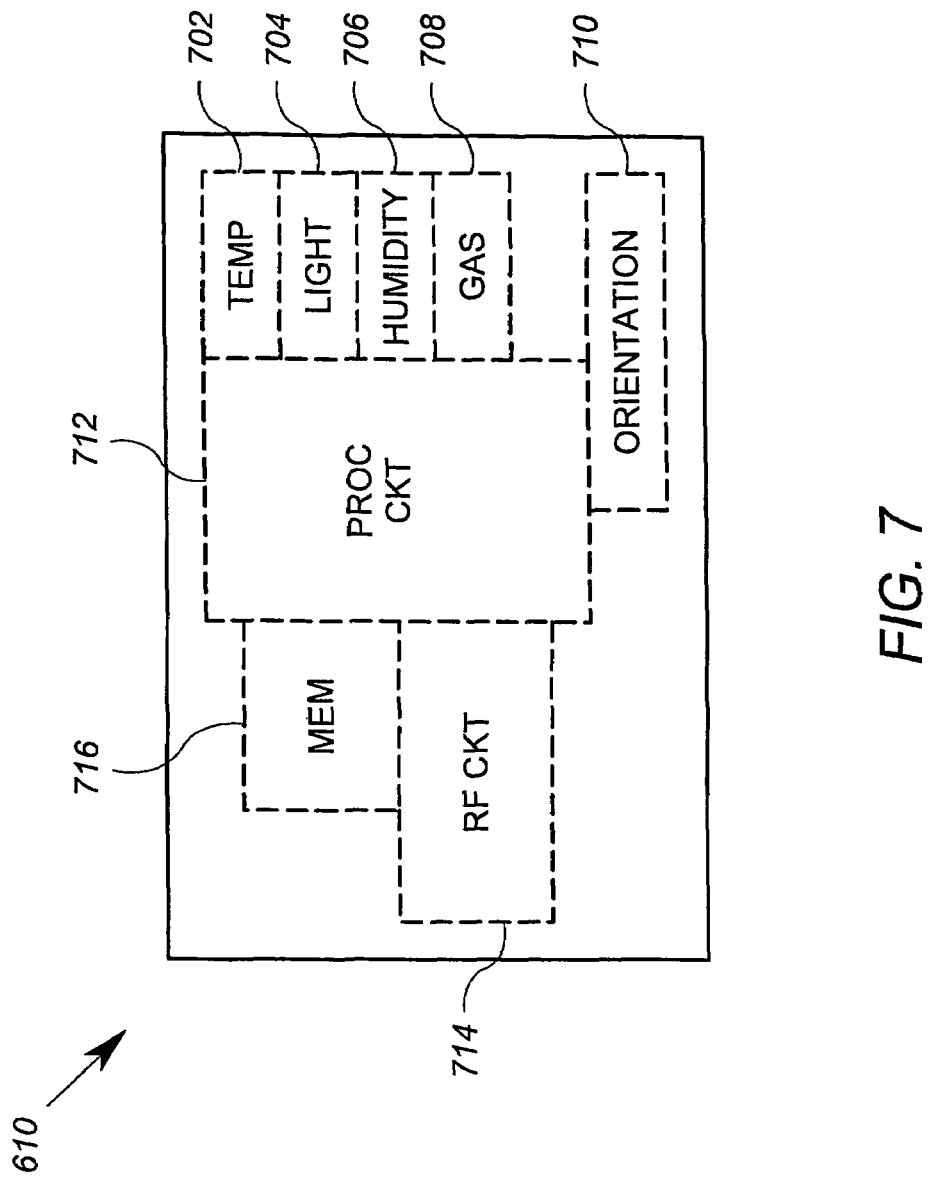
FIG. 7 shows a schematic diagram of an exemplary microsystem that may be used in the embodiment of FIG. 6.

FIG. 7 shows a block diagram schematic of the sensor microsystem 610. The sensor microsystem 610 includes a plurality of sensors including a set of environmental sensors 702, 704, 706 and 708, an orientation sensor 710. The environmental sensors include a temperature sensor 702, a light sensor 704, a humidity sensor 706 and a gas sensor 708. Each of the sensors 702, 704, 706, and 708 are microsystem sensors. By way of example, the temperature sensor 702, humidity sensor 706 and gas sensor 708 may suitably be MEMs microsystem sensors, and the light sensor 704 may be a photodiode or phototransistor device or array. Such devices are generally known in the art. The orientation sensor 710 may suitably be one or more MEMs accelerometer/pressure sensors that can detect the effect of gravity with respect to a particular predetermined orthogonal direction. Such devices are known.

The sensor microsystems may suitably have the general configuration of the sensor module 20 of FIGS. 2 and 3.

In addition to the sensor 702, 704, 706, 708 and 710, the sensor microsystem 610 includes a processing circuit 712, an RF circuit 714 and a memory 716. The processing circuit 712 includes digital processing circuitry as well as driver circuitry and A/D conversion circuit that is necessary for receiving sensor measurements from the sensors 702, 704, 706, 708 and 710 in a format suitably for digital processing. In this respect, the processing circuit 714 may suitably be substantially similar to the processing circuit 44 of FIGS. 2 and 3 discussed further above. Similarly, the RF circuit 714 may suitably be the same as the wireless circuit 42 of FIGS. 2 and 3 discussed further above. However, in one embodiment, the RF circuit 714 includes an RFID circuit that is derives transmission power from incoming signals from another device.

The memory 716 is a storage device configured to store information relating to the measurements taken by one or more of the sensors 702, 704, 706, 708 and 710. Preferably, the memory 716 includes a non-volatile memory such as an EEPROM or other flash-type memory.

Referring again to FIG. 6, while the sensor microsystem 610 of the packaged product 601 has been described in detail, it will be appreciated that each of the packaged products 601, 650, 652, 658 and 660 have similar sensor microsystems 610.

The base stations 654, 662 include RF circuits that are capable of communicating with the RF circuit 714 of the microsystem 610, as well as with the RF circuits of the microsystems on the packaged products 650, 652, 658 and 660. The base station 654 is located in an area relatively proximate to the packaged products 601, 650, 652, and the base station 662 is located in an area relatively proximate to the packaged products 658, 660. In this manner, the transmission RF signal strength requirements of the RF circuits of the microsystems 610 is advantageously limited. The base stations 654 and 662 may be placed on different fixtures within a retail establishment. For example, the base station 654 may be placed on a first refrigeration compartment door, not shown, which is close to the products 601, 652 and 654, while the base station 662 may be placed on a second refrigeration compartment door, not shown, which is close to the products 658 and 660.

As discussed above, the base stations 654, 662 contain RF and processing circuitry configured to communicate with the RF circuits 714 of the sensor microsystems 610. To this end, the base stations 654 and 662 may include circuitry capable of querying and powering RFID circuits. Such circuitry is well known in the art. The base stations 654, 662 are further operably coupled to communicate data with the control station 656. To this end, the base stations 654, 662 may be coupled to the control station 656 via a wired or wireless network.

The check out station 664 may suitably be a retail check out terminal having the ability to identify checked out products via RFID methods (using communication with the sensor microsystems 610 or another RFID tag on the packaged product), or through scanning of a UPC code or the like. The check out station 664 is also operably coupled to the control station 656.

The control station 656 is processing workstation that is operable to receive data and maintain a local database regarding the packaged products 601, 650, 652, 658 and 660 as well as information obtained by the sensor microsystems 610. To this end, the control station 656 may be general purpose computer having the necessary memory, or data store, and network connections that allow the control station 656 to communicate data via the base stations 654, 662 and the check out terminal 664.

Figure 8:
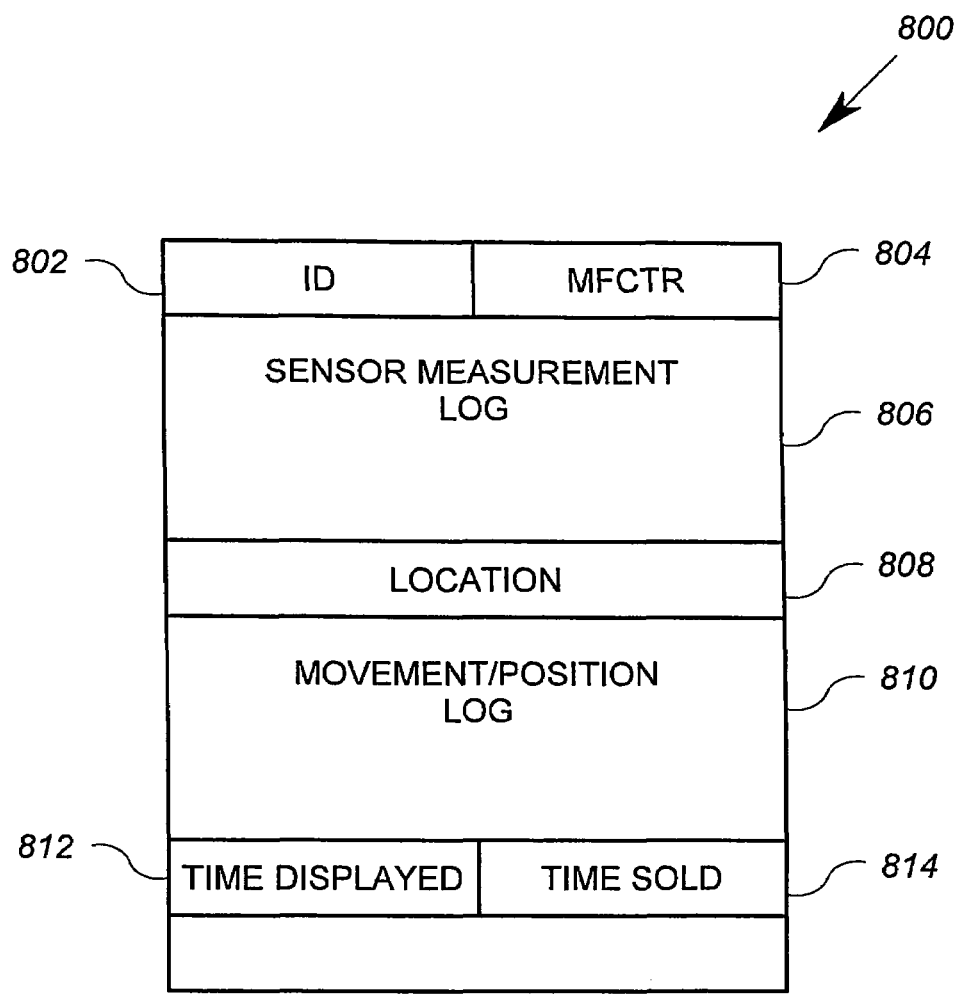
FIG. 8 shows an exemplary data record that is used in connection with the embodiment of FIG. 6

The control station 656 preferably manages, in its data store, a database 666 such as a relational database that relates the packaged products 601, 650, 652, 658 and 660 with data obtained from their associated sensors 610, as well as sale information from the check out scanner 664, if any. FIG. 8 shows a block diagram of the kind of data related to each product.

Referring to FIG. 8, the exemplary data record 800 shows the types of data related to a single product, such as the packaged product 601, within the database 666. Similar data is stored within the database 666 for each of the other packaged products 601, 650, 652, 658 and 660. It will be appreciated that the data record 800 is given by way of example only, and that those of ordinary skill in the art may readily modify the types of data stored for each packaged product to suit their particular implementation needs and sensor capabilities.

In this embodiment, the data record 800 includes a product identification (ID) field 802, a manufacture ID field 804, and sensor measurement log 806. The sensor measurement log 806 includes data regarding temperature, light, humidity, product manipulation, and other data obtained from the sensors on the sensor microsystem 610 of the packaged product 601. Associated with each measurement data item (or group of items) is a time stamp representative of the approximate time that the measurement was taken.

The data record 800 furthermore includes a location field 808, which includes information identifying an approximate location of the product in the establishment. The location field 808 identifies the location within the retail establishment. Multiple locations may be stored if the product is moved. Location information may be determined, for example, by determining which base station 654, 662 has the strongest signal strength with the RF circuit 714 of the product's sensor microsystem 610.

The data record 800 also includes a movement/position log 810. The movement/position log 810 identifies any detected movement events of the packaged product. The detected movements are detected by the position sensor 710. The position sensor 710 is configured to detect a movement event by detecting an alteration of position. The movement log may include information regarding each movement event, such as a time stamp of each movement event, and the dwell time at each orientation of the product. For example, the information for each movement event may include information identifying the amount of time that the packaged product was held at a position associated with reading of the ingredients label 604, a position associated with reading of the price tag 606, and held at a position associated with reading of the cooking or preparation instructions label 608. The amount of time at each position is called the dwell time.

The data record may further contain a field 812 identifying the time that the product was first displayed, and a field 814 identify the time and date that the product was sold.

Thus, the database 666 contains, for a plurality of products in a store (such as the packaged products 601, 650, 652, 658 and 660, the location of the product within the store, the conditions that the product was subject to when in the store, and the time duration that the product was on display before sale, and a history of how often the product was picked up and viewed by a potential purchaser, and what portion of the product packaging was viewed and for how long.

Such information, particularly for large numbers of products, can provide the food product distributors with valuable information regarding retail customer habits, as well as how environmental conditions and product placement may influence sales. Thus, it is preferable that the database 666 be accessible via the control station 656 or by other processing elements. In at least one embodiment, the control station 656 include a web server 657 and allows for remote access to the database by authorized users via the Internet.

In general, the fields of each data record 800 for each sensor microsystem 610 become populated as the sensor microsystem 610 from time to time communicates information detected by the sensors to the control station 656 via their respective base stations or alternative networks. Alternatively, the sensor microsystems 610 may themselves maintain their respective data records 800 and provide the entire data record to the control station 656 during checkout, or on a daily basis.

Thus, the embodiment of FIGS. 6-8 shows an embodiment of the invention that can provide even more data than the system of FIGS. 1-5, albeit possibly at higher costs, as wireless sensor microsystems are used on each product.

It will be appreciated that the above describe embodiments are merely exemplary, and that those of ordinary skill in the art may readily devise their own implementations and modifications that incorporate the principles of the present invention and fall within the spirit and scope thereof.

We claim:

1. An arrangement, comprising:
   a plurality of containers, each having a microsystem disposed thereon, each microsystem configured to sense at least one environmental condition and to sense movement of the corresponding container, the microsystem configured to communicate information regarding the at least one environmental condition and the movement wirelessly;
   a processing circuit operably coupled to receive the information regarding the at least one environmental condition and the movement from each of the microsystems; and
   a data store coupled to the processing circuit, the data store storing at least one data record associated with a movement event for a first of the plurality of containers, the data record containing information regarding each of a predetermined plurality of orientations of the first of the plurality of containers, each of the orientations in the plurality being associated with the first container being held at a position to view a different portion of the first container.

2. The arrangement of claim 1, further comprising a wireless base station configured to communicate wirelessly with the plurality of microsystems, the wireless base station further configured to communicate with the processing circuit.

3. The arrangement of claim 1, wherein the data store contains a database, the database containing environmental and movement information associated with each of the plurality of containers.

4. The arrangement of claim 3, further comprising a point of sale terminal, the point of sale terminal configured to identify a transaction involving one or more of the plurality of containers, the point of sale terminal further configured to communicate information regarding any identified transaction involving one or more of the plurality of containers to the processing circuit.

5. The arrangement of claim 4, wherein the database stores information regarding any transactions involving one or more of the plurality of containers.

6. The arrangement of claim 3, wherein:
   the processing circuit is configured to store timing information in the database such that the timing information is associated with at least the information regarding the environmental conditions.

7. The arrangement of claim 1, wherein the environmental conditions include lighting information.

8. The arrangement of claim 1, wherein the environmental conditions include temperature information.

9. The arrangement of claim 1, wherein the microsystem includes a microelectromechanical sensor configured to detect orientation information regarding the product, and wherein the orientation information comprises the information regarding movement.

10. An arrangement, comprising:
    a plurality of containers, each having a microsystem disposed thereon, each microsystem configured to sense at least one environmental condition and to sense movement of the corresponding container, the microsystem configured to communicate information regarding the at least one environmental condition and the movement wirelessly;
    a processing circuit operably coupled to receive the information regarding the at least one environmental condition and the movement from each of the microsystems;
    a point of sale terminal, the point of sale terminal configured to identify a transaction involving one or more of the plurality of containers, the point of sale terminal further configured to communicate information regarding any identified transaction involving one or more of the plurality of containers to the processing circuit; and
    a data store coupled to the processing circuit, the data store storing a data record associated with each of the containers, the data record including a movement/position log identifying the movement information from the microsystems of the containers, and a time sold field identifying time sold information pertaining to the containers, the time sold information being based on the transaction information received from the point of sale terminal.

11. The arrangement of claim 10, wherein the point of sale terminal is further configured to provide purchase transaction information to another device over a wired network.

12. The arrangement of claim 10, wherein the microsystem includes a microelectromechanical sensor configured to detect orientation information regarding the product, and wherein the orientation information comprises the information regarding movement.

13. The arrangement of claim 1, wherein the data record contains a dwell time at each of the predetermined plurality of orientations of the first of the plurality of containers.

* * * * *